(12) United States Patent
Reistad et al.

(10) Patent No.: US 8,554,591 B2
(45) Date of Patent: Oct. 8, 2013

(54) ELECTRONIC COMMERCE SYSTEM

(75) Inventors: Brian J. Reistad, Sudbury, MA (US);
Eswar Priyadarshan, Worcester, MA
(US); Michael P. Mitchell, Belmont,
MA (US); Jim W. O'Toole, Somerville,
MA (US); Andrew C. Payne, Lincoln,
MA (US); Durval M. Vieira, Peabody,
MA (US); Larry C. Stewart,
Burlington, MA (US)

(73) Assignee: Soverain Software LLC, Chicago, IL
(US)

( * ) Notice: Subject to any disclaimer, the term of this
patent is extended or adjusted under 35
U.S.C. 154(b) by 841 days.

(21) Appl. No.: 12/497,805

(22) Filed: Jul. 6, 2009

(65) Prior Publication Data

US 2009/0307143 A1    Dec. 10, 2009

Related U.S. Application Data

(63) Continuation of application No. 09/054,180, filed on Apr. 1, 1998, now Pat. No. 7,668,782.

(51) Int. Cl.
*G06Q 10/00*   (2012.01)

(52) U.S. Cl.
USPC .............................. 705/5; 705/7.11

(58) Field of Classification Search
USPC .................................... 705/5, 7.11
See application file for complete search history.

(56) References Cited

U.S. PATENT DOCUMENTS 5,056,019 A    10/1991 Schultz et al.
(Continued)

FOREIGN PATENT DOCUMENTS

WO    WO 90/11572    * 10/1990

OTHER PUBLICATIONS

Maes et al. ("Agents that Buy and Sell: Tranforming Commerce as we Know it", 1998 MIT Media Laboratory, Submitted to the Communications of the ACM, Mar. 1999 Issue, 12 pages).*

*Primary Examiner* — James D Nigh
(74) *Attorney, Agent, or Firm* — Sterne, Kessler, Goldstein & Fox PLLC (57) ABSTRACT

An electronic commerce system includes a client computer and a server computer interconnected by a public packet switched communications network. The client computer is programmed to transmit to the server computer an order acceptance request that includes a plurality of terms or conditions of a proposed offer for a purchase, including multiple options of at least one of the terms or conditions of the offer. The server computer is programmed to process the order acceptance request based on pre-programmed criteria and, based on the processing of the order acceptance request, to transmit to the client computer an order acceptance response that includes a plurality of amendments to the proposed offer for the purchase, including selection of an option of the at least one of the terms or conditions. The processing of the order acceptance request is performed by a controller module that handles processing of the order acceptance request that is primarily not specific to a particular application of the electronic commerce system to which the order acceptance request pertains, and that initiates a plurality of calls to a plurality of plug-in modules. The server can handle fraud-avoidance processing of the order acceptance request. The server can initiate a call to a database of a virtual warehouse in which merchants store virtual inventories of items, to ensure that a sufficient virtual inventory exists for a purchase.

17 Claims, 4 Drawing Sheets

(56) References Cited

U.S. PATENT DOCUMENTS

| | | | | |
|---|---|---|---|---|
| 5,557,780 | A | 9/1996 | Edwards et al. | |
| 5,710,886 | A | 1/1998 | Christensen et al. | |
| 5,710,887 | A | 1/1998 | Chelliah et al. | |
| 5,717,989 | A | 2/1998 | Tozzoli et al. | |
| 5,724,424 | A | 3/1998 | Gifford | |
| 5,774,870 | A | 6/1998 | Storey | |
| 5,794,207 | A | 8/1998 | Walker et al. | |
| 5,794,210 | A | 8/1998 | Goldhaber et al. | |
| 5,794,234 | A | 8/1998 | Church et al. | |
| 5,797,127 | A * | 8/1998 | Walker et al. | 705/5 |
| 5,799,285 | A | 8/1998 | Klingman | |
| 5,809,144 | A | 9/1998 | Sirbu et al. | |
| 5,845,265 | A * | 12/1998 | Woolston | 705/37 |
| 5,855,007 | A | 12/1998 | Jovicic et al. | |
| 5,860,068 | A | 1/1999 | Cook | |
| 5,873,071 | A | 2/1999 | Ferstenberg et al. | |
| 5,898,781 | A | 4/1999 | Shanton | |
| 5,903,652 | A | 5/1999 | Mital | |
| 5,903,882 | A | 5/1999 | Asay et al. | |
| 5,909,492 | A | 6/1999 | Payne et al. | |
| 5,978,770 | A * | 11/1999 | Waytena et al. | 705/5 |
| 6,005,935 | A | 12/1999 | Civanlar | |
| 6,005,945 | A | 12/1999 | Whitehouse | |
| 6,057,872 | A | 5/2000 | Candelore | |
| 6,058,379 | A * | 5/2000 | Odom et al. | 705/37 |
| 6,112,185 | A * | 8/2000 | Walker et al. | 705/5 |
| 6,125,384 | A * | 9/2000 | Brandt et al. | 709/203 |
| 6,175,922 | B1 | 1/2001 | Wang | |
| 6,321,208 | B1 | 11/2001 | Barnett et al. | |
| 6,336,098 | B1 | 1/2002 | Fortenberry et al. | |
| 6,385,731 | B2 | 5/2002 | Ananda | |
| 2002/0002485 | A1 | 1/2002 | O'Brien et al. | |
| 2002/0046107 | A1 | 4/2002 | Marshall et al. | |
| 2002/0194069 | A1 | 12/2002 | Thakur et al. | |
| 2003/0037072 | A1 | 2/2003 | Bowman et al. | |

* cited by examiner

ELECTRONIC COMMERCE SYSTEM

CROSS-REFERENCE TO RELATED APPLICATIONS

This application is a continuation of, and claims priority to, U.S. application Ser. No. 09/054,180, titled Electronic Commerce System. The entirety of this prior application is hereby incorporated by reference into the present application.

REFERENCE TO APPENDICES

Text Appendices A-C are included with this patent application.

BACKGROUND OF THE INVENTION

This invention relates to electronic commerce systems implemented using public packet switched communications networks.

U.S. Pat. No. 5,724,424, the entire disclosure of which is hereby incorporated herein by reference, filed Dec. 16, 1993 by David K. Gifford and issued on Mar. 3, 1998, discloses an electronic commerce system that allows buyer computers to purchase goods or information from merchant computers over a public packet switched communications networks. The merchant computers cause electronic documents to be sent to buyer computers containing forms that buyers can fill out and return to the merchant computers to request purchases. A payment computer obtains authorization of payment orders for purchases in real time from an external financial authorization network.

SUMMARY OF THE INVENTION

One aspect of the invention provides an electronic commerce system that includes a client computer and a server computer interconnected by a public packet switched communications network. The client computer is programmed to transmit to the server computer an order acceptance request that includes a plurality of terms or conditions of a proposed offer for a purchase, including multiple options of at least one of the terms or conditions of the offer. The server computer is programmed to process the order acceptance request based on pre-programmed criteria and, based on the processing of the order acceptance request, to transmit to the client computer an order acceptance response that includes amendment to the proposed offer for the purchase. The amendment includes selection of an option of the at least one of the terms or conditions.

According to another aspect of the invention, the order acceptance response includes a plurality of amendments to the proposed offer for the purchase.

According to another aspect of the invention, the order acceptance request includes a plurality of modular elements individually protected by cryptographic security codes. The server computer is programmed to authenticate the cryptographic security codes and to examine the modular elements individually protected by the cryptographic security codes.

According to another aspect of the invention, the processing of the order acceptance request is performed by a controller module that handles processing of the order acceptance request that is primarily not specific to a particular application of the electronic commerce system to which the order acceptance request pertains, and that initiates a plurality of calls to a plurality of plug-in modules. The plug-in modules handle processing of the order acceptance request that is primarily specific to the particular application of the electronic commerce system, and can be readily replaced by different plug-in modules that handle processing primarily specific to different applications of the electronic commerce system.

According to another aspect of the invention, the server computer further being programmed to handle fraud-avoidance processing of the order acceptance request based on contents of the order acceptance request other than price, purchaser identity, and seller identity.

According to another aspect of the invention, the server transmits to the client computer an order acceptance response comprising amendment to the proposed offer for the purchase, where the amendment includes an amended price based on terms or conditions recited in the order acceptance request that are less than optimal based on the pre-programmed criteria.

According to another aspect of the invention, the server initiates a call to a database of a virtual warehouse in which merchants store virtual inventories of items, to ensure that a sufficient virtual inventory exists for the purchase.

According to another aspect of the invention, one of the client computers is programmed to transmit to the server computer a first order acceptance request that includes a plurality of terms or conditions of a proposed offer for a purchase of a gift certificate. Another of the client computers is programmed to transmit a second order acceptance request that includes the gift certificate. The server computer is programmed to store gift certificate information in a database when it receives the first order acceptance request and to examine the database when the server computer receives the second order acceptance request.

According to another aspect of the invention, the proposed offer is for a purchase of tokens to be redeemed for micro-purchases, and the server computer is programmed to increase a number of tokens in a token database that are available for use in exchange for the micro-purchases.

According to another aspect of the invention, the proposed offer is for a purchase of a subscription, and the server is programmed to update a subscription table in order to reflect the purchase of the subscription.

Numerous additional features and advantages of the invention will become apparent from the detailed description, drawings, and claims.

DETAILED DESCRIPTION

Figure 1:
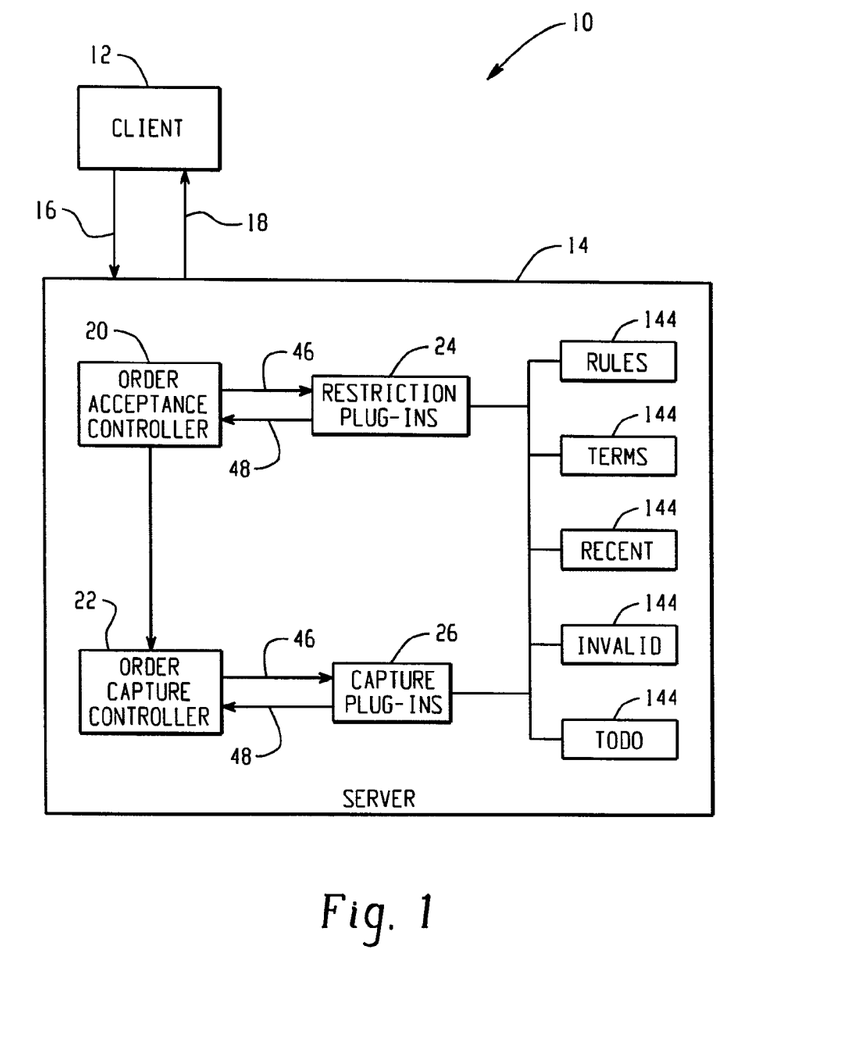
FIG. 1 is a block diagram of an electronic commerce system according to the invention.

With reference to FIG. 1, the invention provides an electronic commerce system 10 that enables automated processing of on-line orders using advanced order acceptability criteria. The electronic commerce system negotiates with client computers 12, which may be operated, for example, by buyers who wish to purchase goods or services, or by agents who make purchase for or make sales to buyers. Once the negotiation phase is complete, or independently thereof, the electronic commerce system can enter a transaction phase in which an order by client computer 12 for goods or services to be delivered by a seller is "captured" by server 14.

According to the negotiated order acceptance protocol of electronic commerce system 10, client computer 12 first sends an order acceptance request message 16 to server 14. Order acceptance request 16 may contain information identifying the buyer (which may or may not be the client), the seller, the goods, products, or services that the buyer wishes to purchase, optional information describing terms or conditions of the purchasing transaction that the client considers desirable, and unique order-identifying information for use by client computer 12 and server 14 to speed order processing and for use in identifying the order in other related protocols. Such terms or conditions may include intended means of payment, time of payment, payment guarantee conditions, shipping methods, time and place of delivery, insurance coverage, risk-of-loss provisions, cancellation policies, goods acceptance criteria, and other terms. In a particular embodiment, header files useful in implementing the protocol described above are shown in portions of Appendix B.

Server 14 processes order acceptance request 16 and generates an order acceptance response 18 containing the original order acceptance request amended to indicate the terms or conditions acceptable to server 14 and which may contain unique order-identifying information. These amendments signify that certain terms or conditions specified in, or omitted from, order acceptance request 16 constitute violations of the server's order acceptance criteria. The amendments include a list of specific order acceptance criteria, each of which indicates specifically the section of the original order acceptance request to which it refers and indicates alternative choices that would be acceptable to server 14. An amendment may indicate that server 14 rejects a specific term or condition and may contain a menu of proposed replacement terms, or an amendment may refer to an element of the proposed order that was omitted from order acceptance request 16 and may propose a menu of acceptable terms or conditions for that element.

Order acceptance request 16 may optionally contain client approval status information. For example, the client approval status information may indicate that the client wishes to obtain the server's opinion of order acceptance request 16, to be expressed in the form of an order acceptance response 18 that includes remarks from server 14, as part of the negotiation phase of the electronic commerce transaction. Upon receipt of order acceptance response 18 from server 14, the client is free to abandon the transaction, to incorporate the server's changes into a new order acceptance request, or to change the original order acceptance request in a different way. Client computer 12 and server 14 negotiate until the client is ready come to an agreement. At this point, client computer 12 can enter the transaction phase of the electronic commerce transaction by indicating in the client approval status information that if order acceptance request 16 is acceptable to server 14, the server should "capture" it for client computer 12. If order acceptance request 16 contains no violations of the server's acceptance criteria and the client approval status information indicates that the client desires the order acceptance request 16 to be accepted immediately, server 14 will attempt to "capture" order acceptance request 16, thereby completing the electronic commerce transaction. There can also be other states of the client approval status information that will cause server 14 to attempt to capture order acceptance request 16 if it contains no violations of the server's acceptance criteria (for example, the client approval status information may indicate that the client desires immediate capturing of order acceptance request 16 provided that the client's manager also approves).

The protocol described above enables an automatic negotiation of a commercial transaction between a buyer and a seller or between a client computer operating on behalf of a buyer and a server computer operating on behalf of a seller, where the server computer contains software that must enforce complex order acceptance criteria. The protocol enables the client computer and the server to efficiently negotiate toward a complete and acceptable order because the protocol communicates multiple acceptability criteria between the client computer and the server in each message. For example, order acceptance request 16 can contain multiple terms or conditions options to be filtered by the server, and order acceptance response 18 can contain multiple amendments indicating violations of acceptability criteria. Also, order acceptance response 18 can include a higher total order price that would be acceptable to server 14 in order for server 14 to accept the terms or conditions of the original order acceptance request, or, alternatively, a lower total order price for compensating the client as an inducement for accepting different terms or conditions in order to avoid violating the acceptability criteria, and thus server 14 can implement order-dependent, negotiated hidden pricing. More generally, order acceptance response 18 can include a plurality of various order prices corresponding to various terms or conditions of the offer.

Appendix C contains excerpts from a manual describing one implementation of the electronic commerce system outlined above.

As an example of one implementation of the protocol, in the negotiation phase of an electronic commerce transaction in which the client is a buyer (as opposed to the client being a party that interacts in turn with the buyer), the buyer may click on a digital offer presented by a catalog server to the buyer as an HTML document on a web site, as described in the above-mentioned U.S. Pat. No. 5,724,424, and the buyer receives an order form that identifies the item the buyer might wish to purchase, its price, shipping choices, and payment choices. The buyer can provide billing information in blank boxes on the form, and the buyer might have the option of choosing a different shipper or a different payment instrument. The buyer can then click on a "recalculate" button on the order form which causes the buyer's order acceptance request 16, in the form of an order document indicating what the buyer would like the transaction to be, to be presented to the electronic commerce software.

By clicking on the "recalculate" button, the buyer causes the client approval status information in order acceptance request 16 to indicate that the buyer seeks the server's opinion of order acceptance request 16, to be expressed in the form of an order acceptance response 18 including remarks from server 14. Alternatively, by clicking on a "buy now" button on the form, the buyer causes the client approval status information to indicate that if order acceptance request 16 is acceptable to server 14, the server should "capture" it for the buyer.

The negotiation phase is driven by the client (in the above case the client is the buyer) in that server 14 cannot accept an order acceptance request 16 unless client computer 12 specifically requests that the server do so. If, for example, client computer 12 submits to server 14 an order acceptance request 16 in which the client approval status information indicates that client computer 12 requests an order acceptance response 18 in the form of a quote or containing tax and shipping options, charges, payment choices, etc., server 14 cannot accept the client's order acceptance request 16. On the other hand, client computer 12 can submit to server 14 an order acceptance request 16 in which the client approval status information indicates that if it is acceptable to server 14, the server may accept it by "capturing" it.

Order acceptance request 16 and order acceptance response 18 are communicated in an extensible structured message format having a variable set of fields, such as XML (extensible markup language) or SGML. In one embodiment the messages would be communicated between client computer 12 and server 14 using a two-way-authenticated connection, for example an SSL connection using a shared key known to client computer 12 and server 14. Alternatively, identities can be established through the use of certificates. In other alternative embodiments order acceptance request 16 and order acceptance response 18 are encoded and decoded using well-known encoding and decoding techniques. Order acceptance request 16 and order acceptance response 18 may also contain information that has been digitally signed or authenticated. The integrity of modular elements of order acceptance request 16 and order acceptance response 18 can be separately protected by protection codes embedded within the protected modular element. The protection codes can be implemented using digital signatures or message authentication codes or other well-known cryptographic security techniques. The embedding of these codes within modular elements of the messages enables client computer 12 and server 14 to efficiently store and forward the modular elements together with their protection codes. For example, an order acceptance request 16 may contain a digital coupon, protected by a protection code, that client computer 12 has obtained from a third party. Applications of such digital coupons in one context of electronic commerce system 10 are described in more detail below.

The negotiation phase involves an exchange of documents that can contain a wealth of information. For example, an order acceptance response 18 to client computer 12 can include a list of acceptable payment choices, a list of possible shipping options, error messages, the results of tax computations, and the result of shipping computations.

The electronic commerce software automatically performs the functions of a seller during the negotiation phase. Because the software does not require a single module to handle all of the seller's functions, the seller can add its own modules to the software at will in order to cause additional negotiation functions to be performed. For example, a seller can add modules to the software that perform inventory control, fraud checking, rejection of orders to P.O. boxes, notification to fulfillment houses, etc.

The architecture of the electronic commerce software, which runs on server 14, includes an order acceptance controller 20 and an order capture controller 22 that exchange information with client computer 12.

In an electronic commerce transaction in which the client is a buyer, server 14 may cause an order form HTML document to be displayed to a buyer by way of a web browser on the buyer's personal computer. The order form is an electronic representation of a paper form that can include empty spaces for the buyer's name, the buyer's billing address, the item or items to be purchased, the price for each item, the shipping method or methods preferred by the buyer, the payment method or methods preferred by the buyer, and so on, analogous to an order form from a department store catalog. Server 14 receives the completed order form and uses the information contained therein and the date to construct an order acceptance request 16 for consideration by order acceptance controller 20 and order capture controller 22.

Order acceptance controller 20 and order capture controller 22 represent the seller. Order acceptance controller 20 is responsible for calculating or checking taxes, shipping methods, coupons, payment options (such as different credit cards, purchase orders), etc., and order capture controller 22 is responsible for completing a transaction that has been accepted by order acceptance controller 20.

In the above-described situations in which the client is a buyer, server 14 transmits order forms to and receives order forms from client computer 12 using software at server 14 that interfaces with order acceptance controller 20 and order capture controller 22 through an order entry API (application program interface). It is also possible, however, for client computer 12 to interface directly with order acceptance controller 20 and order capture controller 22 through the order entry API, which specifies the protocol by which client computers and servers communicate about orders according to an agreed-to terminology. By virtue of this architecture, the seller or a third party is free to construct software at client computer 12 that interfaces with the order entry API and that allows a buyer to fill out an order form that can be very different from the order forms that happen to be provided by electronic commerce software (not shown in the figures) residing on server 14. This architecture accommodates sellers or third parties that don't like the order form provided by server 14 or who prefer to integrate the order composition process in a manner that does not even necessarily involve presenting an order form to the buyer. For example, the seller or third party might set up a question and answer interview with the buyer to create the order.

Thus, the seller or a third party might want to provide a user interface to the buyer that is different from the user interface that can be provided by server 14. The order entry API lets the seller or third party create that user interface. The seller or third party still must collect the same information that is requested by order acceptance controller 20 and order capture controller 22, but the seller or third party can choose to ask questions of the buyer in a different order, or can choose not to present some options to the buyer and instead pick the options on behalf of the buyer.

For example, one implementation involves a 1-800 number that a buyer can call and speak with an operator who acts as a proxy for the buyer. The 1-800 company functions as a client of the electronic commerce system. The operator might need to use an internal ordering system that is arranged in a particular format and that does not correspond with the default user interface. The seller can provide a different user interface to the operator of the 1-800 number by providing appropriate software at the client computer.

If a buyer wishes to purchase a new automobile, for example, the buyer could call such a 1-800 number and place an order for a particular type of automobile. The client computer at the 1-800 company can automatically generate, based on the input from the buyer, one of a number of different order forms, depending upon the type of automobile selected by the buyer. The different types of order forms are compatible with different order acceptance controllers and order capture controllers operated by different automobile companies. This arrangement allows a buyer who might be uncertain as to what type of automobile to buy to call an independent person whose service is to offer a one-stop location at which the buyer can propose offers on different types of automobiles manufactured by different companies.

Likewise, a buyer might call a travel agency that can sell the buyer a hotel room, a plane flight, and golf times, and the travel agency (which functions as a client of the electronic commerce system) will parcel the information provided by the buyer into a number of separate orders that the travel agency sends to a hotel, an airline, and a golf course.

Thus, the order entry API functions as a connection point where clients (such as the 1-800 company and travel agency described above) and sellers can meet in a manner that is independent of a particular user interface. There can be many possible user interfaces that people can create on their own. For example, a consumer magazine company that evaluates products might decide to get into the business of allowing visitors to their web site to place orders for products such as automotive vehicles. The consumer magazine company acts as a client of the electronic commerce system. Part of the value of the web site is to assist a buyer in deciding what to purchase. When the buyer has decided what to purchase, the web site can provide the buyer with an order form that has been custom tailored by the consumer magazine company. The order form allows a buyer to identify constraints such as: a vehicle that is four wheel drive, that is two-door as opposed to four-door, that is black, that gets certain gas mileage. The consumer magazine company's client computer can then communicate with order acceptance controllers and order capture controllers maintained by different truck manufacturers by generating calls through the order entry API's of the manufacturers, in order to identify, through a negotiation process of the type described above, all of the possible options for the buyer subject to the constraints specified by the buyer. After the negotiation process is complete, the consumer magazine company can send an order to the vendor and get the vendor to actually accept the order.

The client computer described above need not necessarily be operated by an agent for the buyer (in the case where the client is an entity other than the buyer), but could instead consist of the buyer's own computer operating custom software sold by a vendor (in the case where the client is the buyer). The electronic commerce systems does not require a seller to trust that the client computer is correctly calculating the terms and conditions for the order (such as the tax), because those terms are enforced by the seller's server 14. The buyer's computer may choose to perform some of these calculations in order to provide a highly interactive and responsive user interface for a client, but in this electronic commerce system, those calculations are always double-checked (or enforced) during the order negotiation phase of operation of the seller's server 14.

Order acceptance controller 20 determines whether an order acceptance request 16 from client computer 12 is acceptable and sends an order acceptance response 18 to client computer 12, and order capture controller 22 accepts an order from a client computer 12 after the negotiation process is complete. When client computer 12 submits an order acceptance request 16 that requests an order acceptance response 18 or further information (for example, by virtue of a buyer clicking on a "recalculate" button), order acceptance controller 20 is run alone, but when client computer 12 submits an order acceptance request 16 that indicates that if order acceptance request 16 is acceptable server 14 should capture it for client computer 12 (for example, by virtue of a buyer clicking on a "buy now" button), order capture controller 22 is run, which in turn calls order acceptance controller 20.

Order acceptance controller 20 and order capture controller 22 include, in one particular embodiment, a specific series of predetermined steps combined with various points for call-outs 46 to optional custom modular plug-in components 24 and 26 that can be supplied by the operator of the software and that operate at server 14 or other servers connected to server 14. Appendix A includes source code interface definitions for the call-out points for this particular embodiment.

Plug-ins 24, 26 provide a modular acceptance pipeline for negotiating and capturing orders in an efficient manner that accommodates the processing of detailed information concerning possible order acceptance violations. Plug-ins 24, 26 can interface with various databases 44 that store various rules, agreement terms, recent activity statistics, offer invalidity conditions, and "to do" instructions. Plug-ins 24, 26 use the information stored in databases 44 in formulating responses 48, to call outs 46. At each call-out point in order acceptance controller 20 and order capture controller 22, the controller either branches to a custom software plug-in 24, 26 added by the operator of the software or, if there is no such plug-in 24, 26 the controller simply continues with the predetermined steps. There can be an arbitrary number of plug-ins 24, 26 at each call-out point, which can be called in an arbitrary order or in an order determined by programming of server 14. If a plug-in fails to respond or responds by indicating that its operation has failed, order acceptance controller 20 or order capture controller 22 may respond to client computer 12 with an error notification or may re-try the call to the plug-in. In general, plug-ins performs functions such as preventing capture of an order acceptance request until a later order acceptance request for the same order contains terms or conditions acceptable to the plug-in. The behavior of a plug-in, including whether the plug-in performs any function at all, and including its setting of terms or conditions (including prices) or its overall negotiation strategy, may depend on the content of the order acceptance request, including, for example, the presence or absence of certain types of coupons, specific information identifying a buyer or seller (authenticated or non-authenticated) or identifying a relationship between buyer and seller, specific types of goods, products or services, or specific terms or conditions specified in the order acceptance request.

Figure 2:
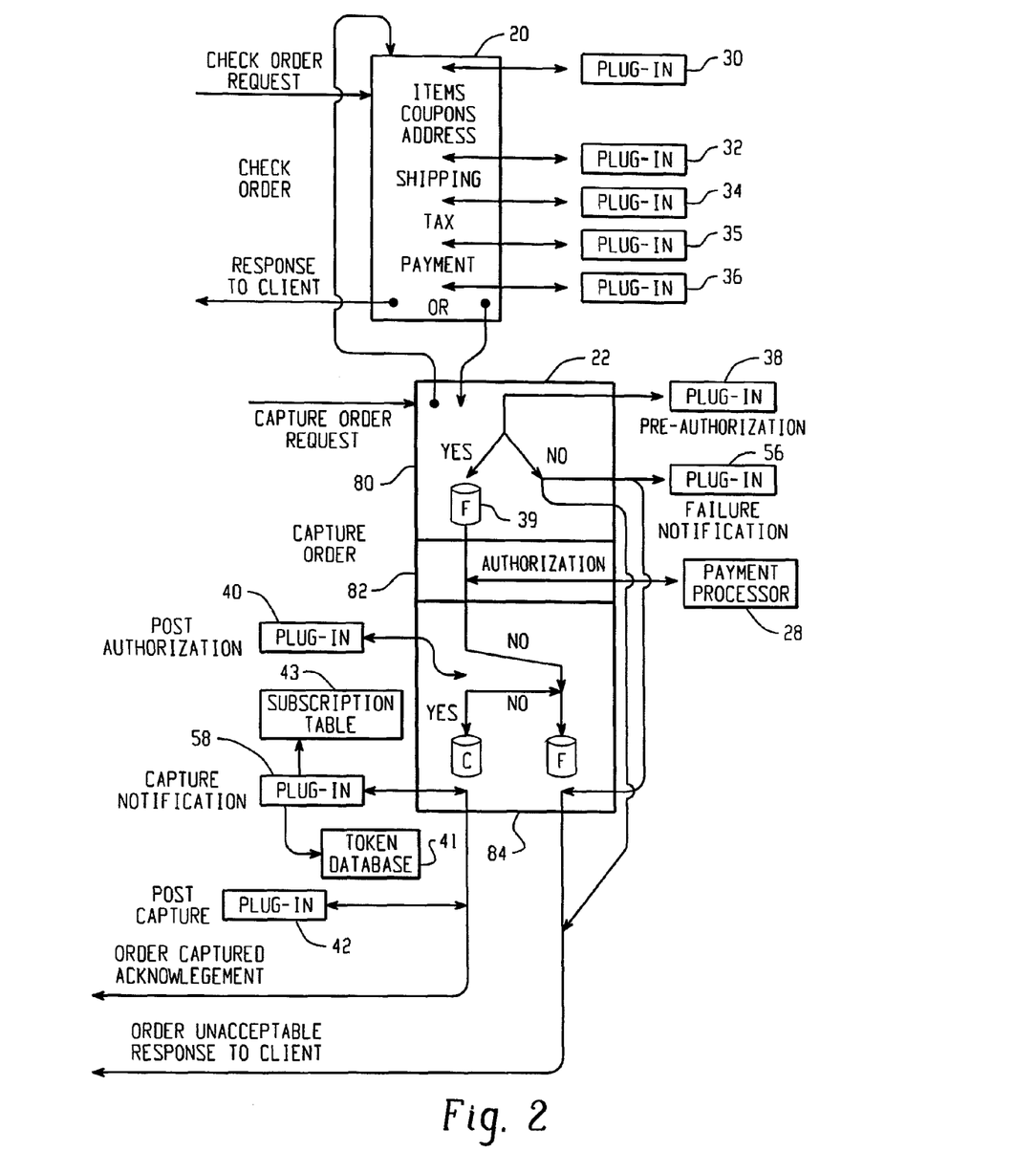
FIG. 2 is a flow-chart diagram of the order acceptance controller and order capture controller of the electronic commerce system of FIG. 1.

For example, with reference to FIG. 2, the seller can insert a restriction plug-in component 30 that performs inventory control. Thus, if a client proposes to purchase a particular model of an automobile in a particular color, and there is only one such automobile that is available, restriction plug-in component 30 might cause order acceptance controller 20 to send the client computer an order acceptance response indicating that the automobile is available for a certain price and it will be reserved for the client computer as long as the client computer purchases the automobile within a certain amount of time. The plug-in component's response would be generated automatically based on some predetermined set of criteria.

In other words, order acceptance controller 20 does not itself provide inventory control, but instead provides a gateway point in the middle of the program logic that allows the operator of the software to make an external call out to an item check restriction plug-in 30 to determine whether that inventory exists so that order acceptance controller 20 may respond appropriately. If the operator of the software does not provide an item check plug-in 30 to order acceptance controller 20, on the other hand, order acceptance controller 20 will simply assumes that the product is readily available and will respond to a client's order acceptance request in accordance with a predetermined set of criteria that has nothing to do with inventory. In this case, if order acceptance controller 20 accepts an order from a client computer, the seller may need to notify the client at some later point in time (by mail for example) of the availability or unavailability of the product.

If the operator of the software does not install any restriction plug-ins, order acceptance controller 20 will operate as follows. When order acceptance controller 20 receives an order acceptance request from a client computer, order acceptance controller 20 performs an item check by looking up the item requested by the client computer and its price and calculating the total amount due based on the quantity requested by the client computer. Then order acceptance controller 20 processes any digital coupons that might be presented by the client computer, in accordance with the techniques described in U.S. patent application Ser. No. 08/741,862, the entire disclosure of which is hereby incorporated herein by reference, filed Oct. 29, 1996 by James W. O'Toole, Jr. et al. and corresponding to PCT Patent Publication WO97/19391. Next, order acceptance controller 20 verifies the billing and shipping addresses specified by the client computer (for example, order acceptance controller 20 determines whether the U.S. Postal Zip Code specified by the client computer matches the city specified by the client computer). Order acceptance controller 20 then performs shipping computation, tax computation (computation of U.S. sales tax, Canadian tax, U.K tax, etc.), and then a payment check to ensure that the client computer has supplied an acceptable payment instrument. If the order acceptance request specifies multiple shipping methods or multiple payment methods that are acceptable to the client, order acceptance controller 20 can select the shipping method or payment instrument most acceptable to order acceptance controller 20 (assuming at least one shipping method or payment instrument is indeed acceptable).

The operator of the software may arrange for a call to be made to one or more item check plug-ins 30 immediately before order acceptance controller 20 performs the standard item check. One type of item check plug-in 30 would be an inventory check plug-in as described above. Another item check plug-in 30 might modify the response of order acceptance controller 20 by, for example, factoring in a reduced per-unit price if the client orders a certain quantity of a particular item or modifying the order acceptance response to suggest to the client that the client might want to take advantage of such a reduced per-unit price by buying the requisite quantity. Likewise, item check plug-in 30 might factor in any special offers that might be applicable on a particular day, or might cause the order acceptance response produced by order acceptance controller 20 to identify a component that the client will receive for free if the client purchases a particular product, or might cause the order acceptance response to inquire whether the client wishes to purchase Product C given that the client has proposed to purchase Product A and Product B, or might cause the client's order acceptance request to be rejected if the client is prohibited from ordering more than a certain number of a particular item and cause the order acceptance response to indicate the reason for rejection, etc. The behavior of the plug-in, including whether the plug-in performs any function at all, may depend on whether a coupon is present in the offer acceptance request or on the type of coupon that is present.

After order acceptance controller 20 performs coupon checking and address checking but before it performs shipping computations, order acceptance controller 20 may call out to another plug-in 32 provided by the operator of the software. Ordinarily, a digital coupon object may be used by any party possessing the coupon, as described in the above-referenced U.S. patent application Ser. No. 08/741,862. The plug-in 32 may, however, reject a coupon if someone other than a particular person who is authorized to use the coupon attempts to use the coupon, or if the coupon object contains a serial number to ensure it is used only once and the plug-in 32 determines that the coupon has been used previously, etc. The plug-in may be able to reject the coupon, for example, because the plug-in can know the identity of the client (because the client computer's authority has been authenticated, for example, by virtue of the use of a two-way-authenticated SSL connection) and the plug-in can know whether that client can be trusted to provide accurate information concerning the identity of a coupon holder. Alternative methods of identification of the client include basic authentication and client certificates.

A plug-in 34 after the predetermined shipping computations can be used either to add or to subtract shipping choices, or to change the calculation of the shipping cost, or to place a call to a shipping company to obtain a tracking number to be included in the order acceptance controller's response to the client computer along with the date of shipment so as to allow the client to make inquiries to the shipping company. A plug-in 35 after the tax check can be used to perform some sort of general checking of the order acceptance request to ensure that the order acceptance request is acceptable, such as checking tax values and the total cost of the order. A plug-in 36 after the payment check can be used to perform some other sort of general checking of the order acceptance request, such as checking whether the proposed method of payment is acceptable for the item requested by the client. In general, each restriction plug-in can affect the results of previous steps only. Each restriction plug-in need not necessarily apply specifically to the results of immediately previous predetermined step alone, but could instead apply to the combined results of more than one previous step. Certain restriction plug-ins can be implemented with "restricted interests," so that they do not perform any function unless certain terms, conditions, or digitally authenticated objects are present in the order acceptance request. Order acceptance controller 20 encodes all of the comments and acceptability violations generated by the restriction plug-ins or order acceptance controller 20 into the order acceptance response, using standard error codes. The comments and acceptability violations serve as instructions for user-interface modules at the client computer in order to facilitate interactive ordering by the client computer by allowing the client computer to quickly correct the order to make it acceptable.

Figure 3:
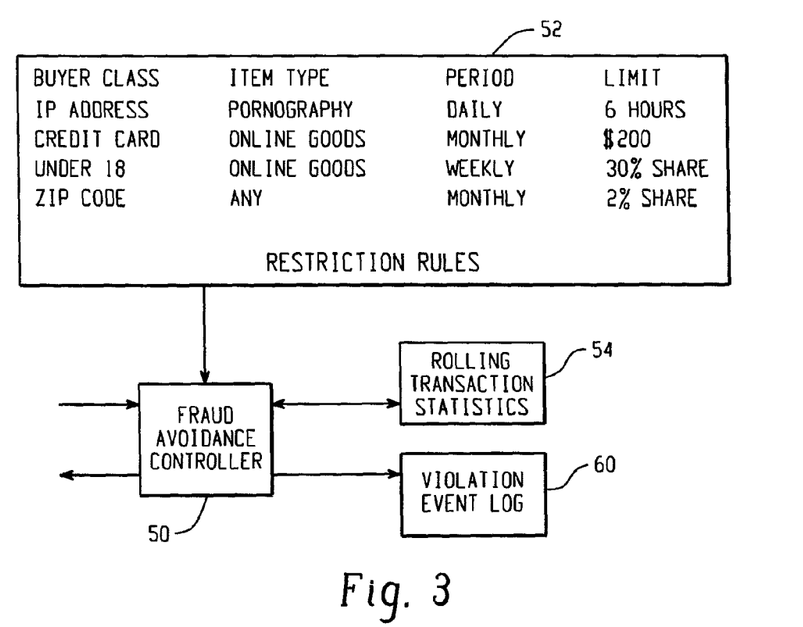
FIG. 3 is a block diagram of a fraud avoidance controller system for use in the electronic commerce system of FIG. 1.

One form of restriction plug-in 36 that can be implemented after the payment check step is an order-dependent fraud avoidance controller. As shown in FIG. 3, fraud avoidance controller 50 interfaces with a rules database 52 that contains various acceptability restriction rules as to which buyer classes are allowed to obtain which types of items and as to limits on the particular types of items that members of particular buying classes are allowed to purchase per period of time. Rules database 52 stores information pertaining to buyer identity, payment means, buyer network contact information (IP address, Email address, etc.), specific items being ordered, delivery address, and other seller-authenticated membership information, credit information, and relationship rating information supplied with the order acceptance request. Such information can be authenticated by the order acceptance controller by authenticating a protection code embedded within a modular element of the order acceptance request that contains the information. Fraud avoidance controller 50 also interfaces with a rolling transaction statistics database 54 in which fraud avoidance controller 50 stores information pertaining to each order in a statistical profile keyed by item, type of item, buyer identity, buyer location, buyer pseudo-identity, buyer cyberspace pseudo-location, or type of equipment or software used by the client source or transmission path, along with an indication whether the order was accepted, rejected, or processed to test acceptance prior to final buyer approval (fraud avoidance controller obtains information concerning acceptances and rejections from the failure notification module and capture notification module described below). Fraud avoidance controller 50 compares each current order acceptance request to rolling transaction statistics database 54, and if the current order acceptance request or violates any maximum transaction rates as defined in restriction rules database 52, or otherwise violates any transaction rule in restriction rules database 52, then fraud avoidance controller 50 logs an event in violation event log 60 and may also cause the order acceptance request to be rejected.

When the client computer submits an order acceptance request 16 and indicates that if the order acceptance request is acceptable the server should capture it for the client, order capture controller 22 first causes order acceptance controller 20 to run to ensure that there are no problems with the order acceptance request. Then, if the response of order acceptance controller 20 indicates that the order acceptance request is acceptable, order capture controller 22 proceeds through three database sub-transactions. The first sub-transaction 80 is a pre-authorization call to a custom capture plug-in 38 supplied by the operator of the software that might do some sort of expensive checking procedure that the operator of the software does not wish to perform during the order acceptance process. The pre-authorization call is followed by writing the order acceptance request into a database 39 if the results of the checking procedure performed by plug-in 38 are favorable or by calling a failure notification plug-in 56 to provide notification that the order acceptance request has failed. The second sub-transaction 82 involves a call to a payment processor 28, such as the processor of a credit card company, to obtain authorization for the overall transaction, in the manner described in the above-mentioned U.S. Pat. No. 5,724,424. The client may be able to select the payment processor that is used by identifying its preferred payment method (for example, a particular credit card company) in the order acceptance request, provided that the preferred payment method is acceptable to the server. In the third sub-transaction 84 performed by order capture controller 22, if the overall transaction is not authorized by the payment processor, or if any capture plug-in 38 generates an acceptability violation, order capture controller 22 marks the transaction as being failed, calls out to a failure notification plug-in 56 indicating that the order failed, and encodes any comments and acceptability violations generated by capture plug-in 38 or order capture controller 22 into an order acceptance response to the client computer, using standard error codes. If the transaction is authorized by the payment processor, order capture controller 22 may mark the transaction as being captured, call out to a capture notification module 58, and notify the client computer in an order acceptance response. Alternatively, if the transaction is authorized by the payment processor, order capture controller 22 may call out to a custom capture plug-in 40 supplied by the operator of the software that can perform additional checking over what the payment processor does, to provide a higher level of security. If custom capture plug-in 40 rejects the transaction, order capture controller 22 marks the transaction as being failed, calls out to the failure notification module 56, and notifies the client computer as described above. If custom capture plug-in 40 accepts the transaction, order capture controller 22 places the order in a capture state, calls out to the capture notification module 58, and notifies the client computer.

Each of sub-transactions 80, 82, and 84, at the end of its processing, either "commits" if processing has proceeded successfully, which terminates the processing of the sub-transaction, or "rolls back" if there has been some sort of problem with the processing, in which case the sub-transaction attempts to begin its processing again. This architecture minimizes the potential of locking of databases that are accessed by order capture controller 22, because only a portion of the overall processing of order capture controller 22 actually repeats itself in the event of a problem.

Failure notification and capture notification is useful because, for example, there are two ways to do inventory reservation. One method is to reserve inventory during the order acceptance process and to subject it to a time window. Then when the client computer requests an order capture during the time window, the capture notification module 58 notifies the reservation system that the time window is no longer applicable and the product is really going to be purchased. Another method is to perform a tentative reservation during the order acceptance process or at the top of the capture order process and then if the order is not captured the failure notification module 56 can notify the reservation system that the reservation should be cancelled.

Capture notification plug-in 58 is advantageous in that, for example, the plug-in can be supplied by a seller of newspaper subscriptions and may update a subscription table 43 that lists periodicals to which a person has access. A subscription table 43 keeps track of the newspapers and periodicals to which a particular person has access and keeps track of when the access expires. Newspapers and periodicals can use the subscription table 43 to control access to subscription content, by inquiring whether a particular person has a subscription that has not expired. If the subscription table 43 indicates yes then the newspaper or periodical will grant access, but if the answer is no then the newspaper or periodical can inform the person that access has been denied and inquire whether the person wishes to subscribe.

Micro-transaction purchases can be handled by order capture controller 22 using such a subscription table 43. If a client wishes to initiate a subscription to a certain periodical or newspaper at a charge of a certain price per page or article, for example, the client can cause a fixed amount to be paid, and every time the web page of the periodical or newspaper is visited an account will be decremented by the price per page or article. The initial payment can be handled by order acceptance controller 20 and order capture controller 22, and then a capture notification plug-in 58 increase the number of tokens in a token database 41 that are available for use in exchange for reading of each page or article. When the web page of the periodical or newspaper is visited by the party from whom the fixed amount was paid, the number of tokens in the token database 41 is decremented. In this manner the electronic commerce system can provide a cheaper result for an individual who is interested in only a small portion of a periodical or newspaper, as opposed to paying a blanket amount for the right to read the entire periodical or newspaper.

After the authorization has been completed, a final call-out is performed to a custom post-capture plug-in 42 supplied by the operator of the software that can cause functions such as sending of e-mail or any other activity that should be performed only after the transaction has been captured. Because post-capture plug-in 42 operates after sub-transaction 84 has been completed, it is useful for performing functions that consume large amounts of time, without affecting the capture process.

One implementation of the digital coupons discussed above involves gift certificates. The use of gift certificates involves selling the gift certificate and redeeming the gift certificate. In the selling phase, a merchant client computer creates an order acceptance request that includes extension information indicating that the order is a gift certificate for the item requested by the client computer. The order acceptance request is processed in the ordinary manner described above, and when the order acceptance request is captured, a post-capture plug-in of order capture controller 22 creates a serial number for the gift certificate and places it in a database along with its price and sends the client computer the gift certificate, which is a digital coupon that includes the serial number. The purchaser of the gift certificate can then transmit it to a recipient.

In the redemption phase, the recipient can click on an icon of the gift certificate and the recipient will receive a web page of a merchant that sells the product. The recipient receives an order form and initiates an order acceptance request. Plug-in 32 processes the gift certificate as part of the coupon checking step in the manner described above and ensures that the serial number of the coupon has been used only once by checking the database in which the serial number is stored.

Figure 4:
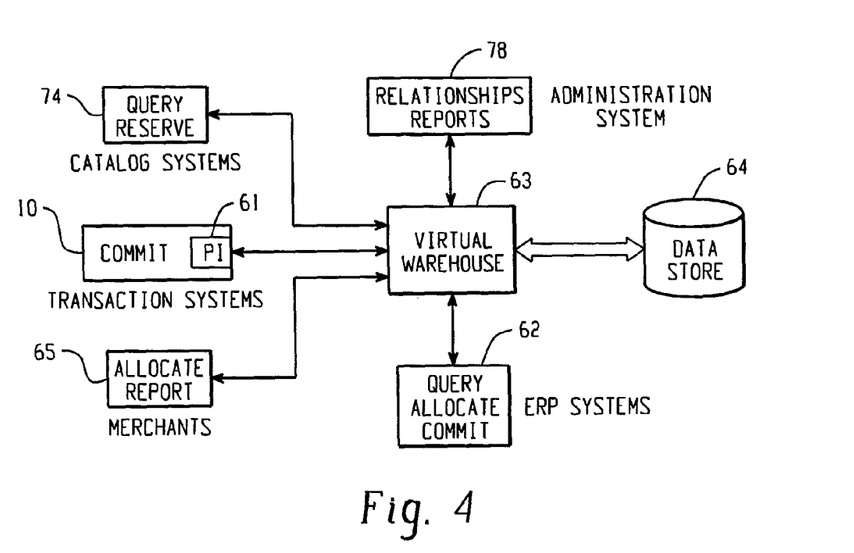
FIG. 4 is a block diagram of an inventory availability controller system for use in the electronic commerce system of FIG. 1.

With reference to FIG. 4, another implementation of the electronic commerce system involves a virtual warehouse system. According to this concept, a merchant 65 can contact a virtual warehouse server 63 through an internet browser and can store a virtual inventory of items for storage in a database 64 that is accessed by item check plug-in 61 (an example of an inventory control plug-in 30 in FIG. 2) through a call to virtual warehouse server 63. Merchant 65 might, for example, provide this information every morning after examining the supply of various items in the merchant's store. The merchant would reserve a fraction of the actual supply of each item for sale within the merchant's physical store and allocate the remaining fraction to the virtual warehouse by storing the inventory of that remaining fraction in database 64. Then, when plug-in 61 performs inventory control, plug-in 61 checks database 64 to ensure that the item or items requested by the client are included in the merchant's virtual inventory, and plug-in 61 modifies the inventory accordingly.

According to the concept of a virtual warehouse, a small or medium enterprise places a portion of its inventory under the management of the virtual warehouse, which can then make commitments to customers against that allocation. For example, a small seller of widgets may create a Web-based catalog. Since the market for widgets depends on immediate gratification of buyers, it is important to assure availability. Each business day, the seller uses an administrative Web application to grant control of a certain number of widgets to the virtual warehouse. When a buyer browses the widget catalog, the catalog system uses a real-time query to the virtual warehouse to obtain the number of widgets on hand. The catalog uses the quantity obtained to control its behavior, selecting regular or promotional pricing. When a buyer selects a widget for purchase, the catalog system obtains a reservation against inventory from the virtual warehouse. The reservation is good for a fixed time such as thirty minutes. The idea is similar to the way airline reservations work. The reservation is good for a fixed time, and lapses if the tickets are not paid for before the reservation expires. When the transaction commits before the reservation expires, the Internet commerce transaction system records that fact with the virtual warehouse, confirming the reservation and removing the appropriate widget count from the allocation. During the day, or periodically, the seller can add or remove inventory from the virtual warehouse, although inventory cannot be removed if held by an active reservation.

In this way, a small enterprise can obtain the benefits of a fully integrated inventory management system without great expense. The virtual warehouse is merely a debit, credit, and reservation system for paper inventory, but the customer is happy because the customer can obtain a guarantee of delivery.

The virtual warehouse breaks down only at the margins: if not all inventory is entered in the virtual warehouse, then some customers may not be able to order when in fact supply is available. However, a customer is never promised delivery when inventory is not available.

The virtual warehouse 63 is built around a database 64 that stores items, inventory, and reservations. Around that database are the applications that interact with it on behalf of catalog systems 74, transaction systems 10 (such as the electronic commerce systems described herein), merchants 65, ERP systems 62, and administrators 78.

Figure 5:
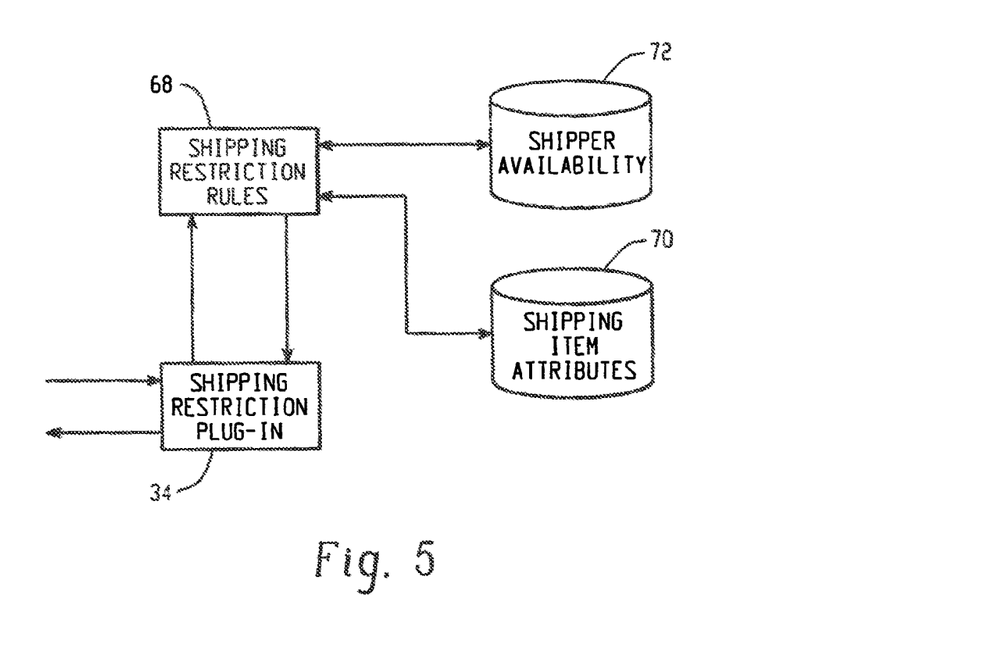
FIG. 5 is a block diagram of a shipping restriction plug-in system for use in the electronic commerce system of FIG. 1.

With reference to FIG. 5, one implementation of another restriction plug-in 34 is a shipping restriction handler. For certain types of orders, the shipping choices may be limited by the details of the order. For example, an order containing certain types of hazardous materials may have a limited number of shipping choices. An order specifying a Saturday delivery to a remote location may have no shipping choices available.

During the negotiation phase, an order acceptance request is routed to shipping restriction plug-in 34, which passes the order acceptance request to shipping restriction rules calculator 68, which figures out which shipping choices are valid for the order. The rules may use a shipping item attributes database 70 that specifies certain shipping-related properties for items in the order. For example, shipping item attributes database 70 would specify that nitric acid is in a certain hazardous materials class. Alternatively, the shipping item attributes could be contained in the order or item descriptions and need not be looked up in database 70.

Shipper availability database 72 specifies which shippers are available for certain types of orders. For example, it would specify that a particular courier ships to a particular remote region on Monday through Friday, for non-hazardous materials only. Based on this availability, shipping restriction rules calculator 68 would not offer that particular courier as a shipping option for an order specifying Saturday delivery in that region, or for any order containing hazardous materials shipped to that region, or for both.

Once shipping restriction rules calculator 68 has determined the list of available shippers for the order, that list as well as optional shipping choice meta-data is returned to shipping restriction plug-in 34 for incorporation into the order acceptance response. The list of available shippers may be empty, which means to the client that the order is not shippable. The list of available shippers may be one, which means that the client does not have a choice. Or, the list of available shippers may be more than one, which means that the client may choose from any of the offered shipping choices. In all cases, the optional shipping choice meta-data provides descriptive text for the buyer about why the shipping choices may be restricted.

There have been described novel and improved electronic commerce systems. It will be apparent to persons skilled in the art that numerous modifications of and departures from the specific embodiments described herein are possible without departing from the scope of the invention as defined in the claims.

What is claimed is:

1. An electronic commerce system, comprising:
   a virtual warehouse server configured to communicate over a network with a seller client and a buyer client, the virtual warehouse server being further configured to receive a product allocation from the seller client, the product allocation providing a set quantity of a product from the seller's inventory that is available for purchase through the electronic commerce system, and storing the product allocation at the virtual warehouse server, wherein the virtual warehouse server is further configured to:
receive, from the buyer client, a request to reserve the product and to check the product allocation to assure availability of the product being purchased,
make a reservation to buy, responsive to the request to reserve the product, against the product allocation, and
release the reservation to buy against the product allocation if the request to reserve the product is not followed by a confirmation of the reservation within a specified period of time.

2. The system of claim 1, wherein the virtual warehouse server is configured to receive communications from a web application to allocate inventory items.

3. The system of claim 2, wherein the virtual warehouse server is configured to automatically reserve one or more of the allocated inventory items for purchase in connection with the request to reserve the product.

4. The system of claim 3, wherein the one or more allocated inventory items are reserved for purchase for a fixed amount of time pending confirmation of the reservation.

5. The system of claim 4, wherein the reservation of the one or more allocated inventory items for purchase lapses if the reservation is not confirmed before expiration of the fixed amount of time.

6. A computer-implemented method of selling products in an electronic commerce system comprising buyer computers, at least one seller computer, and a virtual warehouse system computer coupled via a network, comprising:
receiving a product allocation from the seller computer at the virtual warehouse system computer, the product allocation providing a set quantity of a product from the seller's inventory that is available for purchase through the electronic commerce system;
storing the product allocation at the virtual warehouse system computer;
receiving, from a buyer computer, a request to reserve the product and checking the product allocation at the virtual warehouse system computer to assure availability of the product to be purchased;
making a reservation to buy, responsive to the request to reserve the product against the product allocation at the virtual warehouse system computer; and
releasing the reservation to buy against the product allocation if the request to reserve the product is not followed by a confirmation of the reservation within a specified period of time.

7. The method of claim 6, wherein the product allocation is received over a computer network by the virtual warehouse computer system from a web application.

8. The method of claim 6, further comprising:
receiving a communication from the seller computer at the virtual warehouse to remove an identified number of products from allocation at the virtual warehouse system computer; and
updating the stored product allocation in response to the communication.

9. The method of claim 8, wherein products that are reserved cannot be removed by the seller computer while the reservation is pending.

10. The method of claim 6, wherein storing the product allocation comprises storing an online catalog of products for purchase through the electronic commerce system and wherein checking the product allocation comprises checking a seller allocation of inventory maintained at the virtual warehouse system to assure availability of the product, the method further comprising:
if the selected product is available for purchase, and the electronic commerce system receives the confirmation of the reservation within a specified period of time, then reducing the seller allocation of inventory maintained at the virtual warehouse system to indicate that less product is available for purchase through the electronic commerce system; and
periodically receiving updated seller allocation information and updating the seller allocation of inventory maintained at the virtual warehouse system to indicate the current availability of products available for purchase through the electronic commerce system.

11. The method of claim 10, wherein the updated seller allocation information is received from a web application.

12. The method of claim 6, wherein the electronic commerce system automatically reserves the selected product for purchase in response to the request to reserve the product.

13. The method of claim 12, wherein the selected product is reserved for the specified period of time in response to the request to reserve the product, pending receipt of the confirmation of the reservation.

14. The method of claim 13, wherein the reservation lapses if the confirmation of the reservation is not received before expiration of the specified period of time.

15. The method of claim 13, wherein a product that is reserved cannot be removed from the seller allocation of inventory by the updated seller allocation information.

16. The system of claim 1, wherein confirmation of the reservation comprises payment for the product.

17. The method of claim 6, wherein confirmation of the reservation comprises payment for the product.

* * * * *

UNITED STATES PATENT AND TRADEMARK OFFICE
CERTIFICATE OF CORRECTION

PATENT NO. : 8,554,591 B2  
APPLICATION NO. : 12/497805  
DATED : October 8, 2013  
INVENTOR(S) : Brian J. Reistad Page 1 of 1

It is certified that error appears in the above-identified patent and that said Letters Patent is hereby corrected as shown below:

Title page, Item 57, ABSTRACT, line 13, please replace "an option of the at least one of" with --an option of at least one of--.

In the Specification:

Column 1, line 26, please replace "a public packet switched communications networks" with --a public packet switched communications network--.

Column 15, line 47, please replace "reserve the product against the product" with --reserve the product, against the product--.

Signed and Sealed this  
Seventh Day of January, 2014

Margaret A. Focarino  
*Commissioner for Patents of the United States Patent and Trademark Office*